United States Patent
Ratell et al.

[11] Patent Number: 5,867,886
[45] Date of Patent: Feb. 9, 1999

[54] METHOD OF MAKING A THICK FILM PRESSURE SENSOR

[75] Inventors: Joseph Martin Ratell, Indianapolis; John Marcus Hart, Jr., Kokomo, both of Ind.

[73] Assignee: Delco Electronics Corp., Kokomo, Ind.

[21] Appl. No.: 954,266

[22] Filed: Oct. 20, 1997

[51] Int. Cl.$^6$ ............................ G01R 3/00; G01L 9/06
[52] U.S. Cl. ............................ 29/595; 29/621.1; 73/727; 338/42
[58] Field of Search ........................ 73/727, 721; 338/42; 29/595, 610.1, 620, 621, 621.1

[56] References Cited

U.S. PATENT DOCUMENTS

| | | | |
|---|---|---|---|
| 4,586,018 | 4/1986 | Bettman | 73/720 X |
| 4,657,775 | 4/1987 | Shioiri et al. | 427/38 |
| 4,667,518 | 5/1987 | Iden | 73/753 |
| 4,809,555 | 3/1989 | Kunz | 73/727 |
| 4,965,777 | 10/1990 | Timossi et al. | 73/727 X |
| 4,966,039 | 10/1990 | Dell'Acqua | 73/727 |
| 4,982,351 | 1/1991 | Kawate et al. | |

OTHER PUBLICATIONS

White, *An Assessment of Thick–Film Piezoresistors on Insulated Steel Substrates,* Hybrid Circuits, No. 20, (Sep. 1989), pp. 23–27.
Electro–Science Laboratories, Inc., *Application Notes for Thick Film Heaters made from Dielectric Tape Bonded Stainless Steel Substrates,* (1994). No Month.
Stein et al., *Thick Film Heaters made from Dielectric Tape Bonded Stainless Steel Substrates,* ISHM '95 Proceedings, Boston MA (1994), pp. 125–129. No Month.
Wahlers et al., *Dielectric Tape Bonded Stainless Steel Substrates for High Power Packages, Hybrid Circuitry and Heater Uses,* (1994). No Month.
Chitale et al., *High Gauge Factor Thick Film Resistors for Strain Gauges,* Hybrid Circuit Technology, (May 1989).
Chitale et al., *Piezoresistivity in High GF Thick Film Resistors: Sensor Design and Very Thin YSZ Substrates,* Proceedings 7th IM Conference, Yokohama, Japan (Jun. 1992). pp. 561–570.
Moriwaki et al., *Interactions Between Thick Film Resistors and Alumina Substrates,* Proceedings 7th IM Conference, Yokohama, Japan (Jun. 1992).
Prabhu et al., *Interactions Between Base Metal Thick Film Inks and High Temperature Porcelain–Coated Steel Substrates,* ISHM Symposium, Chicago IL (Oct. 1994), pp. 331–340.

*Primary Examiner*—George Dombroske
*Assistant Examiner*—Joseph L. Felber
*Attorney, Agent, or Firm*—Jimmy L. Funke

[57] ABSTRACT

A media-compatible, high-pressure transducer cell (12), a rugged sensor assembly (10) incorporating the cell (12), and a method for its production. The pressure cell (12) generally includes a metal body having a diaphragm (26), at least one dielectric layer (28, 38) on the diaphragm (26), and at least one thick-film piezoresistive element (34) on the dielectric layer (28, 38) for sensing deflection of the diaphragm (26). For purposes of compatibility with a wide variety of media, the metal body is preferably formed of steel, most preferably a stainless steel alloy such as an AISI Type 300 or 400 Series. The diaphragm (26) can be formed by etching or machining the metal body. The dielectric layers (28, 38) are preferably formed by thick-film processing as done for the piezoresistive element (34), employing materials that will adhere to the metal diaphragm (26), withstand the strains induced as the diaphragm (26) deflects, and faithfully transmit such strains to the thick-film piezoresistor (34).

5 Claims, 1 Drawing Sheet

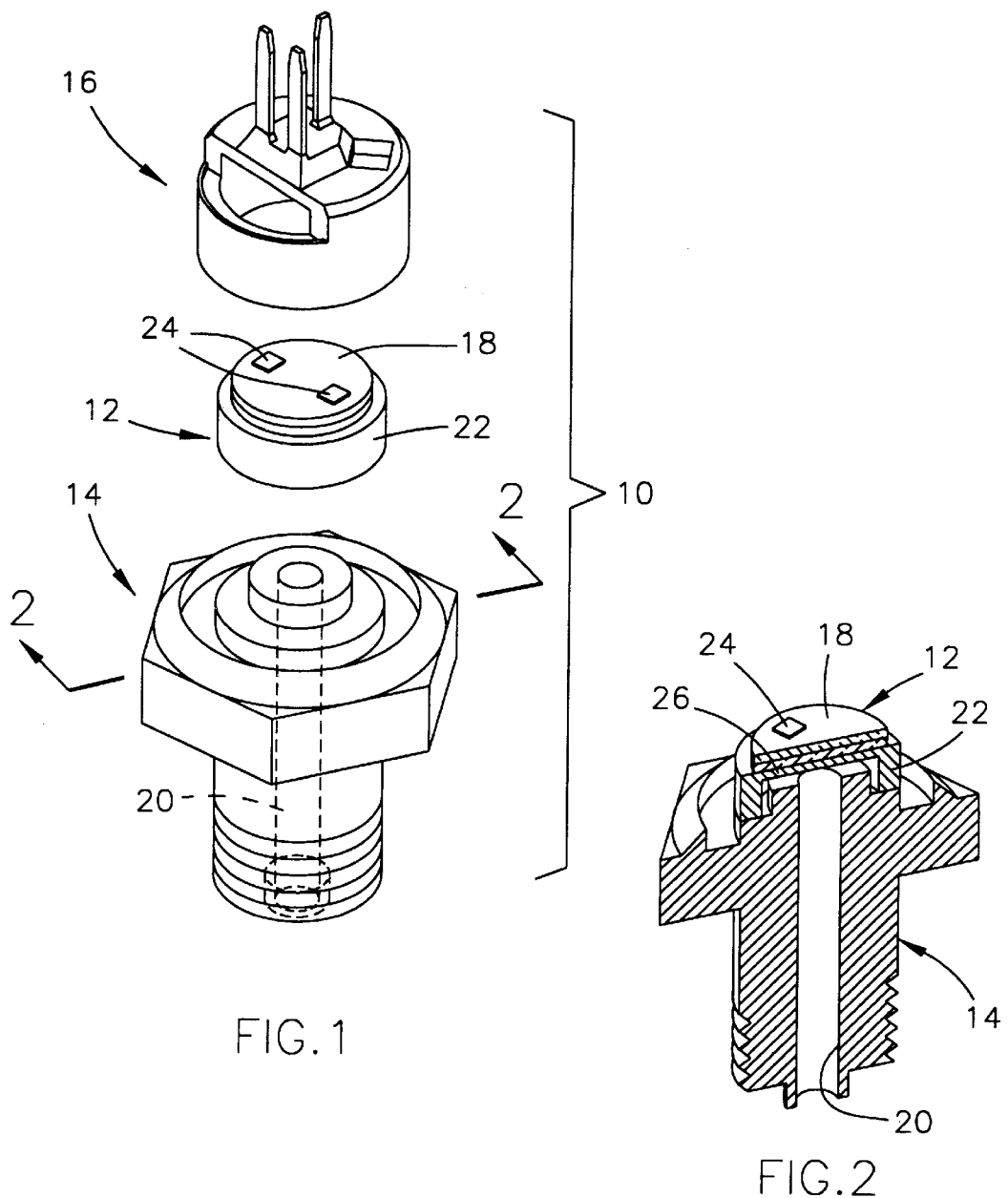
FIG.1
FIG.2
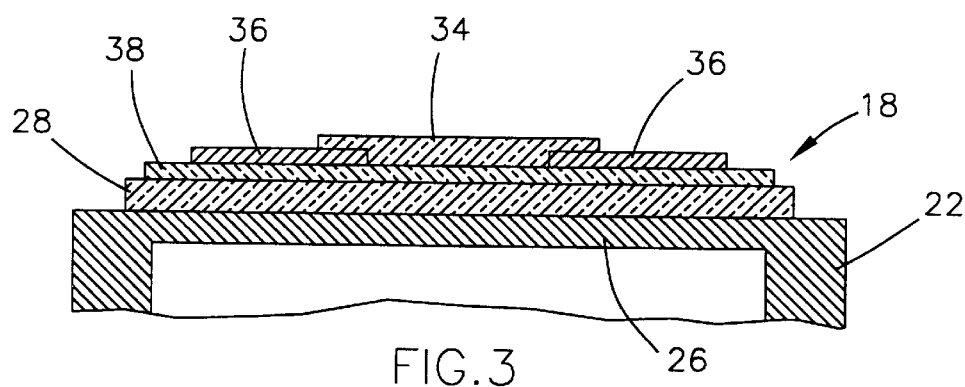
FIG.3

METHOD OF MAKING A THICK FILM PRESSURE SENSOR

FIELD OF THE INVENTION

The present invention generally relates to pressure sensing devices and methods for their production. More particularly, this invention relates to a media-compatible, high-pressure transducer cell that combines a corrosion-resistant diaphragm and thick-film technology to yield a sensor capable of sensing very high pressures while being chemically and mechanically robust, readily manufacturable, and relatively insensitive to temperature variations.

BACKGROUND OF THE INVENTION

There is a continuous effort to develop pressure sensors that are lower in cost and smaller in size, yet are characterized by high reliability, sensitivity and linearity. Sensors finding wide acceptance on the basis of furthering these characteristics include those that utilize semiconductor materials with a micromachined sensing diaphragm, a notable example being micromachined single-crystal silicon pressure transducer cells manufactured using semiconductor fabrication processes. In the processing of such cells, a thin diaphragm is formed in a silicon wafer through preferential chemical etching. Ion implantation and diffusion techniques are then used to drive doping elements into the diaphragm, forming piezoresistive elements whose electrical conductivity changes with strain such that deflection of the diaphragm causes a change in resistance value of the piezoresistive elements, which can then be correlated to the magnitude of the pressure applied to the diaphragm.

Diaphragms of single-crystal silicon pressure transducer cells are typically small, rarely exceeding a few millimeters in width, and are very thin, with a thickness of often less than 100 micrometers. The use of standard single-crystal silicon wafers and standard semiconductor device fabrication processes allows many such cells to be fabricated from a single wafer, providing some economy of scale. However, silicon is susceptible to chemical attack and erosion by various media, particularly in applications where a high-pressure medium is to be sensed, e.g., automotive applications that involve sensing brake fluid, oil, transmission fluid, hydraulic fluid, fuel and steering fluid pressures. For such applications, a pressure sensor must also be physically rugged and resistant to the hostile environment of the sensed medium, necessitating that a micromachined silicon pressure transducer cell include some form of protection in order to realize its advantageous operational characteristics in the chemically hostile environment.

Current methods for producing media-compatible, high-pressure sensors include enclosing a silicon sensing chip in an inert fluid, such as a silicone oil or gel, and then further separating the sensing chip from the medium to be sensed with a metal diaphragm, such that pressure must be transmitted through the metal diaphragm and fluid to the sensing chip. While achieving some of the operational advantages of silicon pressure transducer cells, the manufacturing processes for these sensors, and hence the sensors themselves, are relatively expensive and complicated. As a result, these sensors are not suitable as mass-produced sensors for automotive applications. Furthermore, the influence of the fluid in contact with the silicon pressure transducer cell over the operating temperature range and over time is of sufficient magnitude to require complex electronics to separate their effect on the silicon pressure transducer cell from the effect of pressure.

An alternative approach is to form a capacitor plate on a ceramic diaphragm, which is then bonded to a base with a second capacitor plate. The use of a chemically-resistant and mechanically-tough ceramic materials, such as aluminum oxide or zirconium oxide, allows the diaphragm to directly contact the medium whose pressure is to be measured, thereby eliminating the requirement for protective packaging. As the ceramic diaphragm deflects under the influence of pressure, the gap between the capacitor plates changes, causing a corresponding change in capacitance that can be correlated to the applied pressure. However, the circuit required to detect capacitance changes is somewhat complex and subject to noise corruption. In addition, attaining an adequate seal between the ceramic diaphragm and base for high pressure applications can be difficult.

Yet another approach employing a chemically-resistant ceramic diaphragm uses thick-film piezoresistors that are screen printed on the diaphragm, thereby providing for pressure sensing in the same manner as described above for single-crystal silicon pressure transducer cells. As with ceramic capacitive pressure sensors, the ceramic material is chosen to allow direct contact with the medium whose pressure is to be sensed, eliminating the need for protective packaging. While the signal detection circuitry used is less complicated than that for the capacitive sensor, the difficulty of reliably sealing the ceramic diaphragm with a base is the same as that for the capacitive sensors in high-pressure applications.

Finally, another media-compatible sensor known in the prior art employs a metal diaphragm as the sensing element. Because metal diaphragms generally deflect more for a given thickness and pressure than ceramic diaphragms, which exhibit lower elongations before breaking and are therefore designed to deflect less under pressure, sensing is performed by thin-film polysilicon or metal deposited on a steel diaphragm. The metal diaphragm must first be coated with a dielectric layer to electrically isolate the diaphragm from the thin-film resistors and conductors. A thin-film polysilicon layer is then deposited to form the piezoresistors, followed by thin-film metallization to provide electrical interconnects. As is conventional, the thin-film layers are typically deposited by such processes as chemical or physical vapor deposition. The equipment necessary for these processes is expensive, and deposition rates are extremely slow. Deposition of the thin-film layers requires multiple patterning, exposure, developing and stripping steps for the required thin-film photoresists and metallization, and must be carried out in a controlled environment to assure that no air borne particles are present on the surface to be coated. In addition, because such processes deposit thin-films usually no thicker than 10,000 angstroms, the surface of the metal diaphragm must be extremely smooth to avoid rough surface features penetrating through or producing discontinuities in the deposited thin films. Finally, the resistance of the resulting polysilicon thin-film piezoresistors can vary dramatically with temperature.

While achieving some of the operational advantages of silicon pressure transducer cells, it is apparent that the above sensors and/or their manufacturing processes have significant drawbacks, including complicated manufacturing processes that render the sensors incompatible with mass-production applications. In addition, because of the difficulty of sealing a ceramic sensing element to a ceramic base, the above-noted ceramic pressure transducer cells are generally not suitable for applications in which pressures exceed about 1000 psi (about 7 MPa).

Accordingly, there is a need for a pressure sensor that is compatible with corrosive, high-pressure media, yet is relatively uncomplicated, low in cost, and characterized by high reliability and sensitivity.

SUMMARY OF THE INVENTION

It is an object of this invention to provide a high-pressure sensor having a corrosion-resistant diaphragm that is compatible with a wide variety of corrosive media.

It is another object of this invention that the pressure sensor employs thick-film technology, yielding a sensor that is capable of sensing very high pressures while being chemically and mechanically robust, readily manufacturable to be compatible with mass-production techniques, and relatively insensitive to temperature variations.

It is another object of this invention to provide a method for producing such a pressure sensor.

In accordance with a preferred embodiment of this invention, these and other objects and advantages are accomplished as follows.

The present invention provides a media-compatible, high-pressure transducer cell, a rugged sensor assembly incorporating the cell, and a method for its production. The pressure cell of this invention generally includes a metal body having a diaphragm, at least one dielectric layer on the diaphragm, and at least one thick-film piezoresistive element on the dielectric layer for sensing deflection of the diaphragm. For purposes of compatibility with a wide variety of media, the metal body is preferably formed of a steel, most preferably a stainless steel such as an AISI Type 300 or 400 Series. The diaphragm can be formed by stamping, etching or machining.

The dielectric layer is preferably formed by thick-film processing as done for the piezoresistive elements. For compatibility with the metal diaphragm, the dielectric layer applied to the diaphragm must be formed of a material that will adhere to the metal diaphragm. In addition, a thick-film dielectric layer in accordance with this invention must be capable of withstanding the strains induced as the diaphragm deflects, yet faithfully transmit such strains to the thick-film piezoresistors at a level proportional to the strain in the diaphragm. Such problems are not generally confronted when using thin-film structures employed by pressure sensors of the prior art. In accordance with the present invention, multiple dielectric layers are preferably employed, at least one of which is a thick-film layer. More preferably, all of the dielectric layers are thick films in order to avoid processing incompatibilities that arise if thin-film and thick-film materials and processes are combined to form the multiple dielectric layers and thick-film piezoresistors and metallization required by this invention.

The above-described sensing cell can be assembled to a base by welding. Preferably, the metal body of the pressure sensor cell closes an opening in the base through which the medium to be sensed is delivered to the side of the diaphragm free of the printed layers, such that the diaphragm acts as a seal and mechanical isolator for the printed layers and signal shaping electronics. Further packaging of the pressure cell can include covers and electrical connections known in the art. In addition, the pressure sensor assembly of this invention preferably includes signal conditioning circuitry that is electrically interconnected with the sensing element. The signal conditioning circuitry may be formed on a silicon chip mounted directly to the diaphragm of the sensing cell.

According to this invention, the above structures and processes yield a pressure transducer cell that combines a corrosion-resistant metal diaphragm and thick-film technology, and is capable of sensing very high pressures, e.g., in excess of 10,000 psi (about 70 MPa), while being chemically and mechanically robust, readily manufacturable, and relatively insensitive to temperature variations. Notably, the pressure cell is not encumbered by the enclosures and semiconductor processing required for silicon sensors of the prior art. In addition to being capable of sensing very high pressures, the metal diaphragm can also be readily fabricated to tailor the performance characteristics of the sensor.

Other objects and advantages of this invention will be better appreciated from the following detailed description.

BRIEF DESCRIPTION OF THE DRAWINGS

The above and other advantages of this invention will become more apparent from the following description taken in conjunction with the accompanying drawings, in which:

FIG. 1 is a perspective view of a pressure sensor assembly in accordance with an embodiment of this invention;

FIG. 2 is a cross-sectional view of a sensor cell and base unit shown in FIG. 1; and FIG. 3 is a cross-sectional view of the sensor cell in accordance with a preferred embodiment of this invention.

DETAILED DESCRIPTION OF THE INVENTION

FIG. 1 represents a pressure sensor assembly 10 incorporating a sensing cell 12 in accordance with the present invention. As illustrated, the sensor 10 further includes a base 14 on which the cell 12 is mounted and a connector 16 that encloses the cell 12 with the base 14. The cell 12 is formed to have a sensing element 18 that is capable of deflecting in response to a pressure applied by a medium. As shown in FIGS. 1 and 2, the cell 12 closes one end of a passage 20 in the base 14 through which the sensing element 18 is exposed to the medium to be sensed, though it is foreseeable that the cell 12 and base 14 could be configured differently from that shown to achieve the same desired result. As also indicated in FIGS. 1 and 2, one or more silicon chips 24 having signal conditioning circuitry thereon can be mounted directly to the cell 12. The chips 24 are preferably single-crystal silicon, with the signal conditioning circuitry, such as CMOS, BICMOS or bipolar integrated circuit technology, providing compensation for output errors produced as a result of temperature effects and extraneous stresses.

With reference to FIG. 3, the sensing element 18 of the cell 12 is shown as being composed of multiple layers 28, 34, 36 and 38 on a metal diaphragm 26. According to this invention, the cell 12 and diaphragm 26 are preferably in the form of a monolithic metal structure, with the diaphragm 26 being formed by either conventional stamping, machining or micromachining a metal body, the latter using known etching techniques, with the remainder of the metal body forming an annular-shaped support 22 for the diaphragm 26. Alternatively, it is foreseeable that the diaphragm 26 could be a discrete member that is permanently secured, such as by welding, to the support 22 to form the cell 12.

In a preferred embodiment, the cell 12 is permanently attached to the base 14 to provide a durable fluid-tight seal therebetween. While various methods of attachment are possible, in a preferred embodiment the cell 12 and base 14 are formed of steel alloys and joined by welding. Stainless steel is preferred for the cell 12 and base 14 in order to achieve a suitable level of corrosion resistance to the given medium. While various grades of steel could be used, preferred alloys are AISI Type 300 and 400 Series alloys, with Types 304L and 430 being found to be particularly compatible with materials suitable for the layer 28 contacting and adhered to the metal diaphragm 26, as will be discussed below. However, it is within the scope of this invention to use other stainless steels, as well as carbon and galvanized steels and other metals.

With reference again to FIG. 3, the sensing element 18 is shown as being formed of two dielectric layers 28 and 38, a piezoresistor 34, and contacts 36. The piezoresistor 34 is employed to sense the deflection of the diaphragm 26, while the dielectric layers 28 and 38 are necessary to electrically insulate the piezoresistor 34 from the diaphragm 26. The contacts 36 enable the use of wire bonding to electrically interconnect the conditioning circuitry of the chip 24 to the piezoresistor 34, in addition to electrically interconnecting the circuitry with the exterior connector 16. Alternatively, the chip 24 can be a flip chip and connected to the contacts 36 by known flip chip attachment methods. While a single piezoresistor 34 is shown, it will be understood that any number of piezoresistors could be used, such as for the purpose of using a Wheatstone bridge to process the output of the cell 12.

An important aspect of this invention is that the dielectric layers 28 and 38, the piezoresistor 34 and the contacts 36 are each formed by thick-film processes. Accordingly, each is about 25 $\mu$m (about one mil) or more in thickness, and formed by depositing an appropriate paste or ink using a printing technique or similar process. Consequently, the dielectric layers 28 and 38, piezoresistor 34 and contacts 36 are distinguishable from thin-film structures. The piezoresistor 34 is further distinguishable from implanted or diffused piezoresistors employed with single-crystal pressure cells. According to the invention, suitable inks for the piezoresistor 34 and contacts 36 are known in the art. For example, a commercially available ink found suitable for the piezoresistor 34 is available under the name ESL D-3414 from Electroscience Labs. Thick-film printing processes for depositing the inks and the thermal processing required to fire such inks are generally the same as that necessary in the manufacture of prior art pressure transducer cells that employ a chemically-resistant ceramic diaphragm. Accordingly, such inks and processing will not be discussed in any great detail here.

According to known engineering principles, the diameter and thickness of the diaphragm 26 are relatively sized to ensure that the diaphragm 26 is sufficiently flexible to respond to changes in pressure in the medium, while the base 14 and annular-shaped support 22 provide a structurally rigid support for the diaphragm 26. Suitable dimensions for the diaphragm 26 are a thickness of about 0.02 to about 1.0 millimeters and a diameter of about 4 to about 20 millimeters, though diaphragms having different dimensions are within the scope of this invention.

The flexibility of the metal diaphragm 26 is particularly demanding of the thick-film dielectric layers 28 and 38 and the thick-film piezoresistor 34. In particular, to be compatible with the metal diaphragm 26, the lower dielectric layer 28 must be formed of a material that can be deposited on and will adhere to the diaphragm 26. Similarly, the upper dielectric layer 38 must be formed of a material that is compatible with the materials for the lower dielectric layer 38 and the piezoresistor 34. In addition, each of the thick-film dielectric layers 28 and 38 must withstand the strains induced as the diaphragm deflects, yet faithfully transmit such strains to the thick-film piezoresistor 34 at a level proportional to the strain in the diaphragm 26. Such problems are not generally confronted when using thin-film structures employed by pressure sensors of the prior art. The present invention addresses this difficulty by using multiple dielectric layers, at least the lower dielectric layer 28 preferably containing one or more bonding agents and a mixture of metal oxides. Suitable mixtures of metal oxides are those that, when the dielectric layer 28 is fired, provide for a coefficient of thermal expansion that approximately equals that of the diaphragm 26. Suitable bonding agents are those that are noncorrrosive to the material of the diaphragm 26.

Other possible materials that could be substituted for the metal oxides include porcelain, quartz, $SiO_2$, $Si_3N_4$, SiC, polyimide, etc. Particularly suitable ink compositions for the dielectric layers 28 and 38 include ESL D-4914 and ESL 4913B, respectively, each of which is commercially available from Electroscience Labs. The ESL 4913B ink composition for the dielectric layer 38 has been determined to be compatible with peizoresistors formed of the ESL 3414B ink composition noted above.

Of significance here is that thick-film materials and processing have been determined to form thick-film dielectric layers and piezoresistors that are compatible with a metal sensing diaphragm. That such compatibility is unexpected can be further appreciated from the fact that the above-noted dielectric materials produced by Electroscience Labs are primarily developed for static applications, and not dynamic applications which include a flexing substrate.

To install the sensor 10, the base 14 can be inserted into a port formed through the wall of a vessel containing a pressurized medium. As shown, the base 14 is adapted to thread into a threaded port opening, though another suitable fastening method could be employed to secure the base 14 and form a fluid-tight seal between the base 14 and the vessel. Once appropriately installed, changes in the pressure of the medium will cause the diaphragm 26 to deflect, which is then sensed by the piezoresistor 34 through the dielectric layers 28 and 38.

In the evaluations that led to the present invention, transducer cells were formed from plates of cold rolled stainless steel alloys AISI Type 304L, 430 and 17-7PH, having a thickness of about one millimeter were chemically etched to produce disks either 9.5 or 10.5 millimeters in diameter, with an 8.0 millimeter diameter diaphragm concentric with the outside diameter of the disks.

Diaphragm thicknesses of about 0.2 and about 0.5 millimeter were evaluated. Various treatments and combinations of treatments were given to the disks prior to the printing of thick-film inks on the surfaces of the diaphragms, including degreasing, media blasting, and oxidation. Various commercially-available dielectric inks were printed in combination with various commercially-available piezoresistor inks.

Generally, a glass dielectric ink was applied through a 230 mesh screen, dried at about 150° C. for about 10 to 15 minutes, then fired at about 850° C. for about 10 minutes to form a first thick-film dielectric layer on each of the metal diaphragms, followed by a second dielectric ink that was applied, dried and fired in a similar manner to form a second thick-film dielectric layer overlying the first. In succession, palladium/silver, gold, and piezoresistor inks were then applied, dried, and fired to form the contacts and four thick-film piezoresistors. The piezoresistors and conductors were printed in a patten so as to form a four-resistor Wheatstone bridge, with the piezoresistors arranged on the diaphragm surface so that two of the resistors would be subject to compression and two would subject to tension when force is applied to the diaphragm in a given direction.

The transducer cells were then welded by either tungsten inert gas arc welding or laser welding to a base machined from AISI Type 304 stainless steel. The bases incorporated a threaded portion and flats, allowing the sensor assemblies to be threaded into a manifold, creating a gas tight seal. The manifolds were then connected to a pressure testing apparatus for recording the change in the resistance value of the thick-film piezoresistors as a function of applied pressure and temperature. The output of each transducer cell generally was in the range of about 0.1 to about 0.2 millivolts per psi of applied pressure with an applied voltage of 5VDC to the Wheatstone bridge.

In view of the above, one skilled in the art will appreciate that the sensing cell 12 of this invention provides the operational advantages of a micromachined, single-crystal silicon pressure sensor, yet further has the advantage of being sufficiently rugged, both physically and chemically, to be suitable for sensing a corrosive high-pressure medium. In particular, the sensitivity of the sensor 10 can be readily achieved through appropriate micromachining techniques to form the metal diaphragm 26, whose material can be specifically selected to be resistant to a corrosive medium being sensed. The result is a pressure sensor that is amenable to manufacturing methods that yield a relatively low cost pressure sensor capable of sensing very high pressures, e.g., in excess of 10,000 psi (about 70 MPa), while simultaneously achieving high reliability and high performance within a relatively small sensor package.

While our invention has been described in terms of a preferred embodiment, other forms could be adopted by one skilled in the art. Accordingly, the scope of our invention is to be limited only by the following claims.

What is claimed is:

1. A method of forming a pressure sensor assembly, the method comprising the steps of:

forming a metal body to have a diaphragm;

printing, drying and firing a first layer of thick film dielectric ink on said diaphragm, thereby forming a first dielectric layer on the diaphragm;

printing, drying and firing a second layer of thick film dielectric ink on said first dielectric layer, thereby forming a second dielectric layer on the first dielectric layer; and forming at least one thick-film piezoresistive element on the second dielectric layer for sensing a deflection of the diaphragm.

2. A method as recited in claim 1, wherein the metal body is formed of a steel.

3. A method as recited in claim 1, wherein the first layer of thick film dielectric ink includes a mixture of metal oxides such that the first dielectric layer has a coefficient of thermal expansion that approximately equals a coefficient of thermal expansion of the diaphragm.

4. A method as recited in claim 1, further comprising the step of printing, drying and firing a pattern of thick film conductive ink on said second dielectric layer, thereby forming thick-film metal contacts that contact the piezoresistive element.

5. A method as recited in claim 1, further comprising the step of welding the metal body to a base such that the metal body closes an opening in the base.

* * * * *